No. 709,014. Patented Sept. 16, 1902.
A. I. JACOBS.
DRILL CHUCK.
(Application filed May 10, 1902.)

(No Model.)

Witnesses:
V. R. Holcomb.
C. E. Buckland.

Inventor:
Arthur I. Jacobs,
Harry P. Williams
att.

UNITED STATES PATENT OFFICE.

ARTHUR I. JACOBS, OF HARTFORD, CONNECTICUT.

DRILL-CHUCK.

SPECIFICATION forming part of Letters Patent No. 709,014, dated September 16, 1902.

Application filed May 10, 1902. Serial No. 106,722. (No model.)

*To all whom it may concern:*

Be it known that I, ARTHUR I. JACOBS, a citizen of the United States, residing at Hartford, in the county of Hartford and State of Connecticut, have invented certain new and useful Improvements in Drill-Chucks, of which the following is a specification.

This invention relates to a chuck which has jaws that are movable in recesses inclined to the axis of the body for gripping and releasing the shank of a drill or similar tool.

The object of this invention is to construct a strong chuck of this nature with simple, cheap, and convenient means for opening and closing the tool-holding jaws.

The body of the chuck that is illustrated as embodying the invention has radial sockets or pins for the reception of the end of a key and rack-teeth on an edge of the nut-sleeve for engagement with gear-teeth on the key, so that when the end of the key is applied to the body and turned the meshing of the gear-teeth and the rack-teeth turn the nut and cause the desired movement of the jaws.

Figure 1:
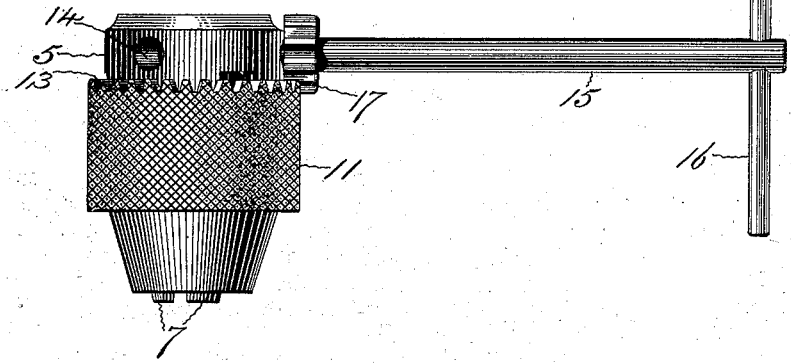
Figure 2:
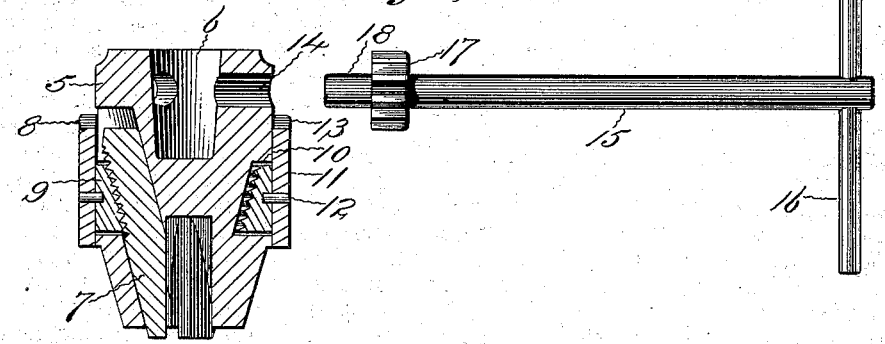
Figure 3:
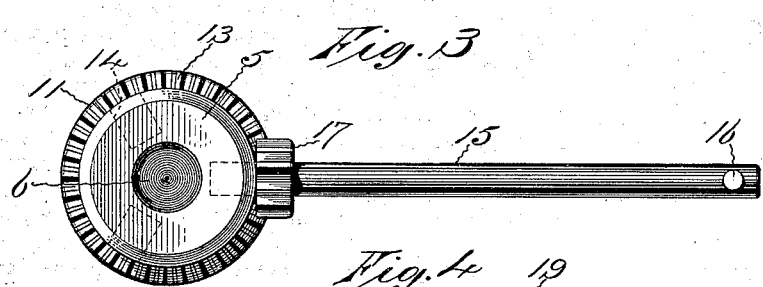
Figure 4:
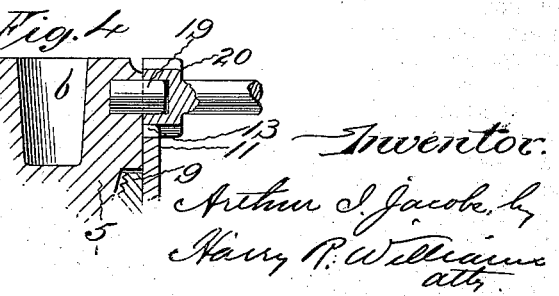

Figure 1 of the accompanying drawings shows a side view of the improved chuck with a key in position for turning the nut-sleeve. Fig. 2 shows a central longitudinal section of the chuck with the key removed. Fig. 3 shows a view of the end of the chuck with the key in position for use, and Fig. 4 shows a section of a portion of the chuck arranged for a modified form of key.

The body 5 of the chuck has the usual tapering socket 6 for the reception of the shank by means of which the chuck is attached to the spindle of a drill-press or lathe.

The jaws 7, of which there are three, are arranged in the inclined recesses 8 and are adapted to be moved obliquely toward and from the axis of the body by the engagement of the threads on the interior of the nut 9 with the threads on their outer edges. The sectional nut is loosely held in an annular recess 10 in the body and is fastened to the sleeves 11 by pins 12 or otherwise. The edge of the nut-sleeve is cut, so as to provide rack-teeth 13, and radial sockets 14 are made in the body of the chuck adjacent to the serrated edge of the sleeve.

The first key that is shown is formed of a spindle 15, having a handle 16 and a gear 17. When the end 18 of this key is inserted into a socket 14, the teeth of the gear will mesh with the rack-teeth on the edge of the sleeve, and when the key thus placed is turned the meshing of the teeth imparts a rotary movement to the sleeve and nut and causes the desired opening or closing of the tool-holding jaws.

As shown in Fig. 4, instead of forming key-sockets in the body pins 19 may be driven into the body so as to project radially, and the end of the key or the gear 20 on the end of the key may be recessed to fit onto the pins. This chuck by the use of one of these keys may be opened and closed without the employment of a spanner for turning the sleeve and without the necessity of holding the body of the chuck or drill-spindle against movement. This effects a saving of time, for a spanner must be applied to the sleeve on one side for turning in one direction and then reversed for turning the sleeve in the opposite direction, and it frees one hand, for the reason that the body of the chuck is held and the sleeve given a rotative movement with relation to the body by the engagement of the key with the body of the chuck and the meshing of the gear-teeth with the rack-teeth on the edge of the sleeve.

The construction is simple and the action is convenient and effective.

I claim as my invention—

1. A drill-chuck having a body with an annular outwardly-opening nut-recess and axially-inclined jaw-recesses, jaws movable in the jaw-recesses and having exterior threads, a nut movable in the nut-recess and having interior threads engaging the threads on the jaws, a sleeve encircling the body, attached to the nut and having on its edge teeth that are adapted to be engaged by a toothed key, substantially as specified.

2. A drill-chuck having a body with an annular outwardly-opening nut-recess and axially-inclined jaw-recesses, jaws movable in the jaw-recesses and having exterior threads, a nut formed in sections, movable in the nut-recess and having interior threads engaging the threads on the jaws, a sleeve encircling the body, attached to the nut-sections and having on its edge teeth that are adapted to be engaged by a toothed key, substantially as specified.

3. A drill-chuck having a body with an annular outwardly-opening nut-recess and axially-inclined jaw-recesses, jaws movable in the jaw-recesses and having exterior threads, a nut movable in the nut-recess, encircling the jaws and having interior threads engaging the threads on the jaws, a sleeve encircling the body outside of the nut-recess, attached to the nut and having teeth on its edge, and a key-recess in the body back of the sleeve adapted to receive a toothed key, substantially as specified.

ARTHUR I. JACOBS.

Witnesses:
 H. R. WILLIAMS,
 V. R. HOLCOMB.